United States Patent [19]

Greene

[11] Patent Number: 5,181,108

[45] Date of Patent: Jan. 19, 1993

[54] GRAPHIC INPUT DEVICE WITH UNIFORM SENSITIVITY AND NO KEYSTONE DISTORTION

[76] Inventor: Richard M. Greene, 700 - 31st Ave., #2, San Francisco, Calif. 94121

[21] Appl. No.: 772,390

[22] Filed: Oct. 7, 1991

[51] Int. Cl.$^5$ .............................................. H04N 7/18
[52] U.S. Cl. ..................................... 358/93; 358/225; 358/209
[58] Field of Search ................... 358/93, 81, 225, 226, 358/217, 250; 359/636, 637, 638, 640

[56] References Cited

U.S. PATENT DOCUMENTS

| | | | |
|---|---|---|---|
| 2,354,614 | 7/1944 | Reason | 88/24 |
| 2,983,183 | 5/1961 | Pickering | 359/638 |
| 3,655,260 | 4/1972 | Bartucci et al. | 350/45 |
| 3,817,626 | 6/1974 | Lietar | 359/639 |
| 3,846,826 | 11/1974 | Mueller | 358/81 |
| 4,561,017 | 12/1985 | Greene | 358/93 |
| 4,896,952 | 1/1990 | Rosenbluth | 350/445 |
| 5,056,889 | 10/1991 | Ohshima | 358/36 |

Primary Examiner—Michael T. Razavi
Assistant Examiner—Tuan V. Ho
Attorney, Agent, or Firm—Limbach & Limbach

[57] ABSTRACT

A graphic input device is described which has uniform sensitivity and is free from keystone distortion. The device includes a triangular prism with one face thereof defining the drawing surface. A camera is mounted on the other side of the drawing surface in a manner to capture light rays which have been totally internally reflected from the drawing surface. A collimating lens is mounted between the prism and the camera and is oriented such that its focal point is coincident with the camera's viewpoint and its principal surface is normal to the camera's optical axis. By placing the camera's viewpoint at the focal point of the collimator, the principal image forming rays will all be parallel within the transparent material. Thus they will intersect the drawing surface in equal angles, providing equal sensitivity everywhere. By making the optical axis of the camera normal to the principal surface of the collimator, these rays will all be made to traverse equal distances while converging towards the viewpoint. Thus keystone distortion is prevented.

6 Claims, 1 Drawing Sheet

GRAPHIC INPUT DEVICE WITH UNIFORM SENSITIVITY AND NO KEYSTONE DISTORTION

BACKGROUND ART

Computer graphic input devices which employ a totally internally reflecting prism have been described by Robert E. Mueller in U.S. Pat. No. 3,846,826 and Richard Greene in U.S. Pat. No. 4,561,017. In both of these devices, the input sensitive drawing surface of the prism is imaged from a center of projection, or viewpoint, which is at a finite distance from that surface. In Mueller's device, the viewpoint is defined by the secondary nodal point of the flying spot scanner lens, and in Greene's device it is the primary nodal point of the camera lens. In both cases, the angle of view of the drawing surface must everywhere exceed the critical angle, in order for total internal reflection to occur. As long as that angle of view is greater than the critical angle at the point on the drawing surface which is closest to the viewpoint, then it must be greater at all other points as well.

However, since the angle of view is closer to the critical angle at the nearer portions of the drawing surface than at the more distant portions, the sensitivity of the device is greater at those nearer portions. That is because less disturbance of the drawing surface is sufficient there to prevent total internal reflection. Also, drawing tools are viewed there less obliquely than at the more distant portions and so provide a stronger signal. Thus, users of such devices find that the parts of the drawing surface nearer the projection center are overly responsive to water droplets and other surface contaminants to which the more distant parts are relatively immune. By the same token, lines drawn from the nearer to the farther parts of the drawing surface appear to decrease in width, even when the actual drawing tool has a constant width and is applied with a constant pressure. The larger the drawing surface is relative to its distance from the projection center, the more severe is this nonuniformity.

A method of equalizing the sensitivity across the drawing surface employed in modifications of Greene's device is to curve the surface of the prism through which the drawing surface is viewed. The appropriate curvature causes the rays converging towards the projection center to be parallel within the prism, so that their angle with the drawing surface is everywhere equal. However, prisms employing such a curved surface are considerably more difficult to manufacture, and hence expensive, than flat surfaced prisms.

In the embodiment of the device described in the prior Greene patent, the camera forms an image of the drawing surface on a plane which is not parallel to that surface. That fact, along with the finite distance of the viewpoint, causes the image to suffer from keystone distortion. Thus a rectangle on the drawing surface is imaged as a trapezoid. As described in the Greene patent, column 8, lines 1 to 65, to compensate for that distortion, the camera electronics can be modified to yield a trapezoidal raster scan.

The curved prism discussed above and used for sensitivity equalization does nothing to prevent keystone distortion, since the rays which come from the more distant portions of the drawing surface traverse a greater distance while converging than those which come from the nearer portions. Thus a camera modified for electronic keystone correction must still be employed with such a curved prism.

In Mueller's device, no keystone distortion occurs since the plane of the flying spot scanner's raster is parallel to the drawing surface. Greene's patent also mentions the possibility of orienting the camera such that its light sensitive surface is parallel to the drawing surface (see column 9, lines 2 to 8). However, such an implementation would require a special purpose lens.

Another optical method for preventing keystone distortion is described in both Richard Edmund Reason's U.S. Pat. No. 2,354,614 and John F. Bartucci and James A. Horton's U.S. Pat. No. 3,655,260. In both of their inventions, a collimating lens is interposed between the tilted object plane and the imaging lens. The collimator is placed such that its focal point is coincident with the primary nodal point of the imaging lens. Thus, the principal image forming rays are all parallel in the space between the object and the collimator, and the image is a parallel projection free of keystone distortion.

The obvious disadvantage of this method is that the collimator must be wider than the object to be imaged and higher than the height of that object times the cosine of its tilt angle. Since keystone distortion is only a significant problem in Greene's device when the drawing surface is large compared to its distance from the camera, this method would require a very large collimator in such an application. Thus it would not be cost effective for keystone correction alone and the motivation to use such an approach would be absent.

While the imaging optics described in Bartucci and Horton's patent are simpler than Reason's, they also require that the tilted object plane be located one collimator focal length away from the collimator. Thus it would seem that a graphic input device employing their method would have to encompass an optical path length between the drawing surface and the camera twice as long as the collimator's focal length. In order to maintain the original size of the device, this would require a short focal length collimator, which is even costlier. Furthermore, Bartucci and Horton's method would seem to require a tilted camera lens.

DISCLOSURE OF THE INVENTION

The invention provides a graphic input device which has both uniform sensitivity and is free of keystone distortion. Its center of projection is effectively at infinity so that the image of the drawing surface becomes an oblique parallel projection rather than a perspective projection. Thus the angle of view and hence the sensitivity is constant across the entire drawing surface and no keystone distortion occurs.

More specifically, a graphical input device is disclosed which includes a transparent material where one surface thereof defines a drawing surface. The index of refraction of the material is greater than the index of refraction of the medium on one side of the drawing surface. A camera is mounted on the other side of the drawing surface in a manner to capture light rays which have been totally internally reflected from the drawing surface. A collimator is mounted between the camera and the drawing surface such that its focal point is coincident with the camera's viewpoint and its principal surface is normal to the camera's optical axis.

By this arrangement, an object located on the upper side of the drawing surface will be imaged by the camera only when and where the object is in direct contact with the drawing surface. By placing the camera's viewpoint at the focal point of the collimator, the principal image forming rays will all be parallel within the transparent material. Thus they will intersect the drawing surface in equal angles, providing equal sensitivity everywhere. By making the optical axis of the camera 5 normal to the principal surface of the collimator, these rays will all be made to traverse equal distances while converging towards the viewpoint. Thus keystone distortion is prevented.

In the preferred embodiment, the drawing surface is defined by one face of a large transparent triangular prism and the collimator is defined by a separate lens. A video camera views the drawing surface through a second face of the prism and through the collimating lens. Since the angle of view is greater than the critical angle, the only light which the camera receives when nothing is touching the drawing surface is that which has reached it by total internal reflection. Thus only those portions of a drawing tool which are in direct contact with the drawing surface can be seen by the camera. Since the angle of view is constant across the surface, so is the responsiveness of the camera to such drawing tools and its immunity to noise produced by unwanted disturbances of that surface. The camera's output may be digitized, processed, and displayed on a video monitor.

Since the collimator provides uniform sensitivity across the drawing surface, an inexpensive flat surfaced prism may be used instead of a curved one. This more than offsets the cost of the large collimator. Thus the collimator provides a cost effective solution to the problems of both keystone correction and sensitivity equalization at once. In an alternative embodiment, the collimator can be formed by curving the second face of the prism.

Contrary to the requirement implied by the patent of Bartucci and Horton, the drawing surface may be located as close to the collimator as possible. Thus a collimator with a focal length almost as long as the original optical path from the drawing surface to the camera may be used without increasing the size of the device. It is also found that the camera lens need not be tilted so long as its focal length is sufficiently less than that of the collimator and it has sufficient depth of field.

BRIEF DESCRIPTION OF THE DRAWINGS

The preferred embodiment of the invention will be further described in connection with the accompanying drawings, in which.

DETAILED DESCRIPTION OF THE PREFERRED EMBODIMENTS

Figure 1:
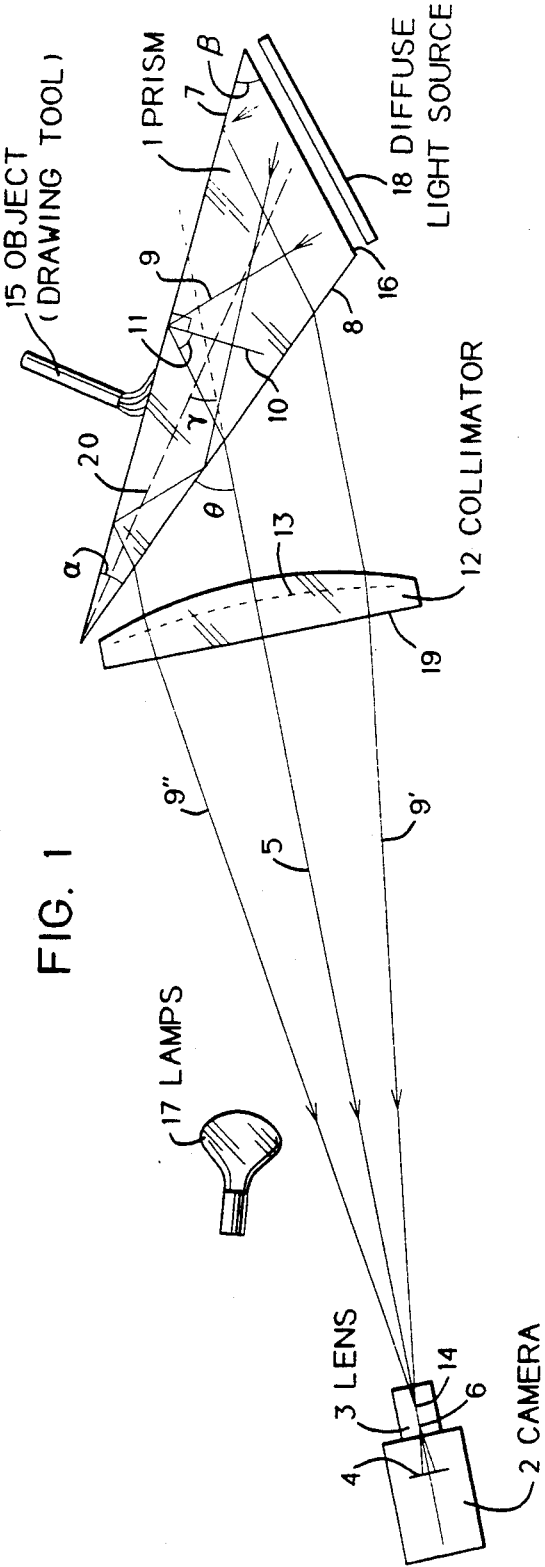
FIG. 1 is a schematic showing of the preferred graphic input device.

The preferred construction of the device is shown schematically in FIG. 1. It uses a large prism 1 composed of a transparent material with an index of refraction significantly greater than that of the surrounding air. It also employs a camera 2 which includes a lens 3 and a light sensitive surface 4 and has an optical axis 5 defined by the normal to the light sensitive surface which passes through the secondary nodal point 6 of the lens. In the preferred implementation, the camera produces a video signal which may be digitized, processed, and displayed in conventional ways. The camera is positioned so that it views the drawing surface 7 of the prism through another surface 8 of the prism and so that the ray of light 9 which travels along the optical axis of the camera intersects the drawing surface normal 10 in an angle 11 which is greater than the critical angle for the material of the prism in air. A collimator 12 is positioned such that its principal surface 13 is normal to the optical axis of the camera. The principal surface of the collimator is defined as that surface at which all of the deflection of the collimated rays may be regarded as taking place. The collimator is also positioned such that its focal point 14 is coincident with the primary nodal point of the camera lens, which is the camera's viewpoint. This causes all of the principal image forming rays, including the most extreme principal rays 9', 9'', to be parallel in the space between the collimator and the prism as well as within the prism itself. Therefore, they will all intersect the drawing surface normal in the same angle as the central ray 9.

Thus when nothing but air is in contact with the drawing surface, the only light which can reach the camera is that which has been totally internally reflected within the prism from that surface. If an object 15 is brought into direct contact with the drawing surface, then the layer of air necessary for total internal reflection will be eliminated at the points of contact, and the camera will be able to view those points of the object. Since the camera views the drawing surface at the same angle everywhere, the contact pressure necessary to provide a particular level of video signal will also be constant across that surface. Many objects used as drawing tools, such as those made of diffusely reflecting or absorbing materials, produce weaker video signals as they are viewed more obliquely. Thus the uniform angle at which the drawing surface is viewed also provides uniformity of the camera's response to such tools. Similarly, the degree of perturbation of the drawing surface (due to water droplets or other contaminants or surface irregularities) sufficient to produce detectable noise in the video signal will also be constant across that surface.

In order to maximize the signal to noise ratio, the brightness contrast between drawing tools and the internally reflected background must be maximized. For light colored tools, this may be accomplished by covering in opaque black the surface 16 of the prism which is viewed by the camera in reflection from the drawing surface. The drawing tools may then be illuminated by lamps 17 which send their light through the collimator and the lower surface 8 of the prism. Lamps positioned above the camera can have their light totally internally reflected at the drawing surface, to make them invisible to users through the prism.

Alternatively, for dark colored drawing tools, the background surface 16 can be provided with a diffuse light source 18 such as an electroluminescent or fluorescent panel. It may be made less visible to the user by tilting the surface and the light source back, making angle $\beta \geq 90°$.

Since the optical axis of the camera is normal to the principal surface of the collimator, the principal rays all traverse equal distances while converging from that surface to their focus at the camera's viewpoint. Thus rays such as 9' and 9'' which subtend equal angles from the central ray 9 where they are converging, will be separated from it by equal distances where they are parallel and will intersect the drawing surface at points equally spaced from the point of intersection of the central ray. In other words, the more distant portions of the drawing surface will appear just as large as the nearer portions, and so no keystone distortion occurs. The collimator has effectively placed the camera's viewpoint at infinity, so that the camera's image is an oblique parallel projection of the drawing surface, rather than a perspective projection.

Since the projection of the drawing surface must be oblique rather than orthogonal (in order to view it from an angle greater than the critical angle), rectangular distortion will still be present. That is, the image of the drawing surface will be foreshortened, or demagnified, in the vertical direction (the dimension in which the surface is tilted with respect to the optical axis). This distortion may be corrected in a variety of ways. Anamorphic optics, such as those consisting of cylindrical lenses or of pairs of prisms, may be mounted in front of the camera's lens to provide magnification in one dimension. In tube-type cameras, the ratio of the width to the height of its raster scan may be adjusted. Special purpose solid state cameras may be manufactured in which the individual photosensitive elements are similarly compressed. A fiber-optic face-plate prism may also be used to provide magnification in one dimension.

Since the camera views the drawing surface from the side opposite the user, it is also necessary to reverse the camera's image. This may be done by reversing the scanning direction within the camera or by including an odd number of mirrors in the optical path between the camera and drawing surface. The latter approach has the advantage of providing a more compact system and allows for more convenient placement of the camera.

The collimator may be provided in the form of refractive optics (lenses), reflective optics (spherical or paraboloidal mirrors), or diffractive optics (zone plates or holographic optical elements). In the preferred implementation, the collimator is a positive lens, corrected for spherical and other aberrations and anti-reflection coated. However, a simple plano-convex spherical lens may be used, provided its f-number is large enough to prevent unacceptable spherical aberration. Such aberration manifests itself in this system as a distortion which can be minimized by facing the planar surface 19 of a plano-convex collimator towards the camera, as shown.

That orientation of a plano-convex collimator is also preferred in systems in which the camera must be prevented from seeing lamp reflections from collimator surfaces. That is because the (internal) reflections from the lens surface which is concave towards the camera can be made to lie farther off axis than reflections from a surface convex towards the camera. In order to avoid lamp reflections completely, it may be necessary to tilt the collimator slightly with respect to the camera's optical axis. However, unacceptable keystone distortion will result from substantial violation of the condition that the camera's optical axis be normal to the collimator's principal surface.

The collimator must be somewhat wider than the part of the drawing surface to be imaged, and higher than the foreshortened height of that portion of the drawing surface. The extra width and height is necessary to accommodate the marginal rays through the camera's lens, in order to avoid vignetting. The prism may be placed as close to the collimator as is physically possible while maintaining the appropriate prism tilt.

In order to obtain the best focus in the camera's image, the camera lens should be tilted with respect to the camera's optical axis to satisfy the Scheimpflug condition for the tilted drawing surface. However, for camera lenses whose focal length is small compared to that of the collimator, that tilt may be negligible. In order to see why, first note that the prism forms a virtual image 20 of the drawing surface which is less tilted than the actual drawing surface. It is this virtual image which provides the effective object plane for the collimator and thence the camera. For a prism with apex angle $\alpha$ and index of refraction n, viewed in parallel projection at an angle $\theta$ with respect to the lower surface 8 of the prism, the angle $\gamma$ between the virtual image of the drawing surface and the optical axis is given by $$\tan \gamma = \frac{\sin \theta}{\cos \theta + \frac{\sin \alpha}{n \cos (\alpha + \arcsin ((\cos \theta)/n))}}$$

Thus, for example, in an acrylic prism with $n=1.489$, $\alpha=20°$, and $\theta=47°$, while the actual drawing surface will be at an angle of only 27° to the optical axis, the virtual image will be at an apparent angle $\gamma$ of 35.63°. In that case, the angle of reflection 11 of the principal rays at the drawing surface will be 47.26°, which provides a 5° noise margin above the critical angle for acrylic of arcsin $(1/1.489) = 42.2°$.

For an object plane inclined at the angle $\gamma$ and with the camera's viewpoint located at the focal point of the collimator, the Scheimpflug condition determines that the optimally focused image will be obtained when the camera's lens is tilted by $$\arcsin (f/(F \tan \gamma))$$

where f is the focal length of the camera's lens and F is the focal length of the collimator. Thus if the collimator's focal length is much greater than that of the camera lens, very little lens tilt will be necessary. Furthermore, such tilting serves only to bring the image into better focus and is not necessary to remove keystone distortion or to provide uniform drawing surface sensitivity. If the camera lens aperture is small relative its distance, approximately F, from the collimator, there will be sufficient depth of field to obviate the need for any lens tilt, and standard lenses and mounts may be used. To continue the previous example in which $\gamma=35.63°$, if the camera's focal length is 1.5" and that of the collimator is 60", the camera lens tilt necessary for optimal focus will be less than 2°. In practice, using such a system with a drawing surface 12.5" high by 17.25" wide, the camera lens at f/2, and the video signal digitized at a resolution of 480 vertical by 500 horizontal, no camera lens tilt is necessary.

In cases where the camera lens is tilted, the separation between its nodal points will cause the camera's optical axis to be separated into two sections. The first, as defined above, will lie between the light sensitive surface 4 and the secondary nodal point 6. The second part will lie outside the camera, parallel to the first but passing through the primary nodal point 14. In such cases, it is this second part of the optical axis which must be normal to the collimator's principal surface in order to prevent keystone distortion.

Figure 2:
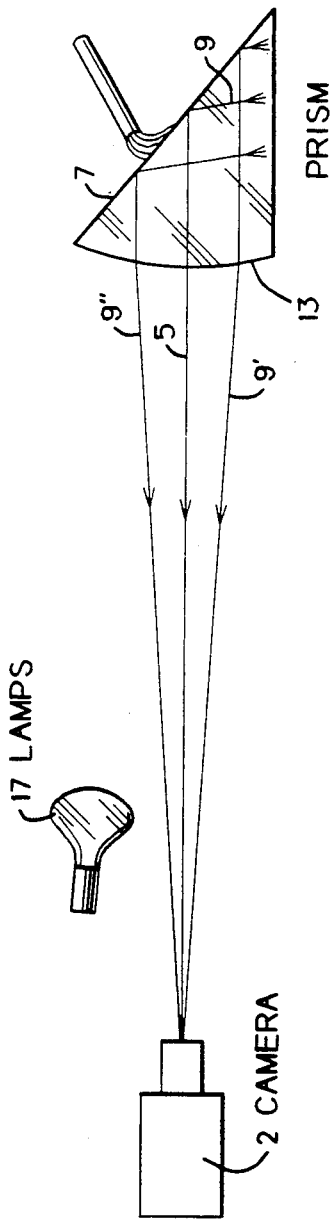
FIG. 2 is a schematic showing of an alternate input device which provides the collimator as a surface of the same transparent material which provides the drawing surface.

An alternate method of constructing the input device is shown schematically in FIG. 2. In this implementation the collimator is provided by a curved surface 13 of the same transparent material which provides the drawing surface 7. Since there is only one refractive surface in such a collimator, the principal surface is the same as that actual curved surface. Thus the optical axis 5 of the camera 2 must be normal to that curved surface, in order to prevent keystone distortion. That requirement distinguishes it from the prior art curved prisms which provide sensitivity equalization without keystone correction.

While a device as illustrated in FIG. 2 has fewer components from one in which the collimator is provided by a separate lens, it also has several disadvantages. First, it requires more of the transparent material and is more difficult to manufacture. It would require even more material and hence be costlier than the prior art curved prisms used with electronic keystone correction. Second, unless the medium between the camera and the collimating surface has an index of refraction even greater than the material which provides the drawing surface, the collimator will present a convex principal surface towards the camera, as shown. Thus the more marginal rays such as 9' and 9", will converge while traversing a greater distance than the more central rays such as 9, and barrel distortion will occur, even if the surface is aspheric. Finally, in devices which employ lamps 17 aimed through such a convex surface to illuminate the drawing tools, reflections may interfere with the camera's view, as in the less preferred orientation of a plano-convex collimator. Thus the preferred implementation of the device employs a collimator which is provided by an optical element separate from the prism.

While the preferred embodiments of the improved computer graphic input device have been disclosed, since different implementations of the invention may be preferred by others, and since modifications will naturally occur to those skilled in this art, the scope of the invention should not be interpreted as limited to the illustrated or described embodiments.

I claim:

1. A graphical input device comprising:
   a transparent material with one surface thereof defining a drawing surface, with the index of refraction of the material being greater than the index of refraction of the medium on one side of the drawing surface;
   camera means mounted on the other side of said drawing surface and located in a manner to only capture light rays which have been totally internally reflected from said drawing surface whereby an object located on said one side of said drawing surface will be imaged by said camera means only when and where said object is in direct contact with said drawing surface; and
   collimator means mounted between said camera means and said drawing surface such that a focal point of said collimator means is substantially coincident with the viewpoint of said camera means and the optical axis of said camera means is substantially normal to the whereby the principal image forming rays are parallel when intersecting said drawing surface and are in equal angles with respect to the drawing surface providing uniform sensitivity and whereby the image formed by said camera means is free of keystone distortion.

2. A graphical input device as recited in claim 1 wherein said material is provided with a prism configuration having at least three faces, one of said faces being said drawing surface, and wherein said camera means captures light rays from said drawing surface through a second face, and wherein said internally reflected light rays originate from a third face.

3. A graphical input device as recited in claim 2 wherein said third face is illuminated and imaged objects are dark.

4. A graphical input device as recited in claim 2 wherein said third face is darkened and imaged objects are illuminated.

5. A graphical input device as recited in claim 1 wherein said collimator means is a lens.

6. A graphical input device as recited in claim 1 wherein said collimator means is defined by a curved surface formed on said transparent material.

* * * * *

UNITED STATES PATENT AND TRADEMARK OFFICE
CERTIFICATE OF CORRECTION

PATENT NO. : 5,181,108

DATED : January 19, 1993

INVENTOR(S) : Richard M. Greene

It is certified that error appears in the above-identified patent and that said Letters Patent is hereby corrected as shown below:

At column 8, line 17, please insert --principal surface of said collimator means-- between the first "the" and "whereby".

Signed and Sealed this

Ninth Day of November, 1993

Attest:

BRUCE LEHMAN

Attesting Officer

*Commissioner of Patents and Trademarks*